United States Patent
Niemi et al.

(10) Patent No.: US 10,020,997 B2
(45) Date of Patent: Jul. 10, 2018

(54) DEVICE COMMUNICATION (75) Inventors: Sami Niemi, Skanör (SE); Manuel Astudillo, Lomma (SE)

(73) Assignee: Nokia Technologies Oy, Espoo (FI)

( * ) Notice: Subject to any disclaimer, the term of this patent is extended or adjusted under 35 U.S.C. 154(b) by 565 days.

(21) Appl. No.: 13/808,540

(22) PCT Filed: May 31, 2011
(Under 37 CFR 1.47)

(86) PCT No.: PCT/SE2011/050678
§ 371 (c)(1),
(2), (4) Date: Jul. 22, 2013

(87) PCT Pub. No.: WO2012/005652
PCT Pub. Date: Jan. 12, 2012

(65) Prior Publication Data
US 2014/0032756 A1    Jan. 30, 2014

(30) Foreign Application Priority Data
Jul. 8, 2010    (EP) .................... 10168922

(51) Int. Cl.
*H04L 12/24*    (2006.01)
*H04L 29/06*    (2006.01)
(Continued)

(52) U.S. Cl.
CPC .............. *H04L 41/28* (2013.01); *H04B 7/24* (2013.01); *H04L 63/08* (2013.01); *H04L 63/18* (2013.01); *H04W 12/06* (2013.01)

(58) Field of Classification Search
CPC ........... H04B 7/24; H04L 41/28; H04L 63/08; H04L 63/18; H04W 12/06
See application file for complete search history.

(56) References Cited

U.S. PATENT DOCUMENTS

| 5,929,848 A | 7/1999 | Albukerk et al. |
| 2004/0123333 A1 | 6/2004 | Nakatsuyama |

(Continued)

FOREIGN PATENT DOCUMENTS

| CN | 101076976 A | 11/2007 |
| CN | 101128052 | 2/2008 |

(Continued)

OTHER PUBLICATIONS

PCT Search Report for International Application No. PCT/SE2011/050678—Date of Completion of Search: Oct. 25, 2011, 5 pages.

(Continued)

*Primary Examiner* — Gil H. Lee
(74) *Attorney, Agent, or Firm* — Locke Lord LLP (57) ABSTRACT

The present invention relates to communications systems, and more particularly to enabling one communications device to access data, such as a set of multimedia objects, accessible by another communications device. Identity code information is communicated between the communications devices and the server, wherein a representation of the identity code is communicated from one of the communications devices to the other of the communications devices and then to the server. The identity code is associated with data accessible by one of the communications device and the data is associated with access rights. The server is thereby able to associate specific communications devices, access rights and contents.

17 Claims, 7 Drawing Sheets

(51) Int. Cl.
*H04W 12/06* (2009.01)
*H04B 7/24* (2006.01)

(56) References Cited

U.S. PATENT DOCUMENTS

| | | |
|---|---|---|
| 2005/0289117 A1 | 12/2005 | Hiraishi et al. |
| 2007/0112687 A1 | 5/2007 | Read |
| 2008/0045189 A1 | 2/2008 | Kim et al. |
| 2008/0209056 A1 | 8/2008 | Choi |
| 2009/0239502 A1 | 9/2009 | Dempo et al. |
| 2009/0254975 A1* | 10/2009 | Turnbull ............ H04L 63/0492 726/3 |
| 2010/0009703 A1 | 1/2010 | Sornay |
| 2010/0029326 A1 | 2/2010 | Bergstrom et al. |
| 2010/0058377 A1* | 3/2010 | Grob et al. .............. 725/14 |
| 2010/0222072 A1 | 9/2010 | Dragt |
| 2010/0222087 A1 | 9/2010 | Dragt |
| 2010/0222088 A1 | 9/2010 | Dragt |
| 2010/0222100 A1 | 9/2010 | Dragt |
| 2010/0223138 A1 | 9/2010 | Dragt |
| 2011/0060902 A1* | 3/2011 | Nagata ................... 713/155 |
| 2011/0219427 A1* | 9/2011 | Hito ................ G06F 21/00 726/3 |
| 2011/0293098 A1* | 12/2011 | Fu et al. ................ 380/286 |
| 2012/0005311 A1* | 1/2012 | Livingston et al. .......... 709/219 |

FOREIGN PATENT DOCUMENTS

| | | |
|---|---|---|
| CN | 101681337 A | 3/2010 |
| EP | 1746518 | 1/2007 |
| EP | 1821459 | 8/2007 |
| EP | 1892603 | 2/2008 |
| EP | 2124420 | 11/2009 |
| GB | 2352587 | 1/2001 |
| KR | 10-0754433 | 8/2007 |
| WO | WO0193047 | 12/2001 |
| WO | WO2008041942 | 4/2008 |
| WO | WO2008115142 | 9/2008 |
| WO | WO2008142455 | 11/2008 |
| WO | WO2009101549 A2 | 8/2009 |

OTHER PUBLICATIONS

English Language Machine Translation of Korean Patent Application Publication No. KR10-0754433, 11 pages.
English Language Machine Translation of Chinese Patent Application Publication No. CN101128052A—5 pages.
PCT Search Report for International Application No. PCT/SE2011/050855—Date of Completion of Search: Oct. 26, 2011, 5 pages.
English Language Machine Translation of Chinese Patent Application Publication No. CN101076976A—17 pages.
English Language Machine Translation of Chinese Patent Application Publication No. CN101681337A—16 pages.
Extended European Search Report for European Patent Application No. 11803884.3, dated Feb. 28, 2017, 6 pages.
Intellectual Property of India Examination Report for Application No. 952/CHENP/2013 dated Apr. 27, 2018.

* cited by examiner

DEVICE COMMUNICATION

TECHNICAL FIELD OF THE INVENTION

The present invention relates to the field of communications systems, and more particularly to enabling a second communications device to access a set of multimedia objects accessible by a first communications device.

BACKGROUND OF THE INVENTION

Over the last few years communications devices, such as mobile phones, have evolved from being just communications devices to being handheld multimedia devices. In addition, more and more devices are being provided with communications interfaces. Thus, the number of devices being able to communicate information between each other is constantly increasing.

The number of services and applications being based on communications between such devices is also increases. A few examples include, but are not limited to, social medias based on digital networks, instant message sharing, sharing and displaying of information, and the like.

Thus, as the number of communications devices increases so too does the need to communicate date between the communications devices. It may therefore be desired that the communications devices should be arranged to instantly initiate communications with each other in an intuitive and instant way.

Short-range radio communication technologies based on the Bluetooth® standard (Bluetooth® is a registered trademark) or WiFi, allow devices to broadcast a short-range radio signal, thereby letting their presence to be known to other devices. Thereby two devices may be paired.

There has also been proposed a pairing process based on physically bumping the two devices to be paired with each other. Each device generates a timestamp associated with the bump and transmits the timestamp together with location information (such as GPS coordinates or cell information) to a server. The server may use this information as input to mathematical methods in order to determine which devices that bumped together.

SUMMARY OF THE INVENTION

It may still be difficult or at least cumbersome to view multimedia content on a mobile phone since its screen is, in comparison to other communications devices, rather small. In general, there are three types of big screens available at most locations: TVs, computer screens/projectors, and tablet computers. The common denominator of these devices is that they are in most cases enabled to be connected to a wide area network, such as the Internet, or a local area network, and almost always connected locally to cheap high-speed networks. It would therefore be desirable to utilize the screen of a TV, computer screen/projector, or tablet computer in order to display a set of multimedia objects accessible by, for example, a mobile phone or other communications device.

According to a first aspect there is provided a method in a system comprising a first communications device, a second communications device, and a server for allowing the second communications device to access a set of multimedia objects accessible by the first communications device, comprising communicating identity code information between the first communications device, the second communications device, and the server, wherein a representation of the identity code is communicated from one of the first communications device and the second communications device to the other of the first communications device and the second communications device and then from said other device to the server, the server thereby associating a specific first communications device with a specific second communications device; associating, by the first communications device, the identity code or the representation thereof with a set of multimedia objects accessible by the mobile phone, the set of multimedia objects being associated with access rights; sending, by the first communications device, information relating to the set of multimedia objects to the server; receiving, by the server, the information relating to the set of multimedia objects; generating, by the server, credentials relating to the set of multimedia objects and the access rights associated therewith based on the association of the specific first communications device with the specific second communications device; sending, by the server, the credentials to the second communications device; and receiving, by the second communications device, the credentials, thereby allowing the second communications device to access the set of multimedia objects and to manipulate the set of multimedia objects according to the access rights.

Advantageously the system thereby allows a user of the first communications device to send content to any second communications device without a two-way connection being established between the first communications device and the second communications device. The system thus simplifies the connection.

Advantageously the system thereby also allows the second communications device to access content specified by the first communications device without the content being directly transmitted from the first communications device to the second communications device. This system simplifies the transmission of content.

Advantageously the system thereby also allows the first communications device to be used as a remote controller for the second communications device of content specified by the first communications device and accessible by the second communications device. The system thus provides increase user operability and interaction.

According to a second aspect there is provided a method in a first communications device for allowing a second communications device to access a set of multimedia objects accessible by the first communications device, comprising communicating identity code information with the second communications device and the server, wherein a representation of the identity code is communicated from one of the first communications device and the second communications device to the other of the first communications device and the second communications device and then from said other device to the server, the server thereby associating a specific first communications device with a specific second communications device; associating the identity code or the representation thereof with a set of multimedia objects accessible by the mobile phone, the set of multimedia objects being associated with access rights; and sending information relating to the set of multimedia objects to the server, thereby enabling the server to, by the server sending credentials relating to the set of multimedia objects and the access rights associated therewith and a resolved identity of the second communications device to the second communications device, allow the second communications device to access the set of multimedia objects and to manipulate the set of multimedia objects according to the access rights.

According to a third aspect there is provided a method in a second communications for allowing the second communications device to access a set of multimedia objects accessible by a first communications device, comprising communicating identity code information with the first communications device and the server, wherein a representation of the identity code is communicated from one of the first communications device and the second communications device to the other of the first communications device and the second communications device and then from the said device to the server, the server thereby associating a specific first communications device with a specific second communications device; and receiving credentials relating to a set of multimedia objects accessible by the mobile phone and access rights associated therewith and a resolved identity of the second communications device from the server, the credentials thereby allowing the second communications device to access the set of multimedia objects and to manipulate the set of multimedia objects according to the access rights.

According to a fourth aspect there is provided a method in a server for allowing a second communications device to access a set of multimedia objects accessible by a first communications device, comprising communicating identity code information with the first communications device and the second communications device, wherein a representation of the identity code is communicated from one of the first communications device and the second communications device to the other of the first communications device and the second communications device and then from said other device to the server, the server thereby associating a specific first communications device with a specific second communications device; receiving information relating to a set of multimedia objects from the first communications device, the set of multimedia objects being accessible by the mobile phone; generating credentials relating to the set of multimedia objects and access rights associated therewith; and sending the credentials to the second communications device, thereby allowing the second communications device to access the set of multimedia objects and to manipulate the set of multimedia objects according to the access rights.

According to a fifth aspect there is provided a first communications device for allowing a second communications device to access a set of multimedia objects accessible by the first communications device, comprising communication means arranged to communicate identity code information with the second communications device and the server, wherein a representation of the identity code is communicated from one of the first communications device and the second communications device to the other of the first communications device and the second communications device and then from said other device to the server, the server thereby associating a specific first communications device with a specific second communications device, the server thereby associating a specific first communications device with a specific second communications device; a processing unit arranged to associate the identity code or the representation thereof with a set of multimedia objects accessible by the mobile phone, the set of multimedia objects being associated with access rights; and a transmitter arranged to send information relating to the set of multimedia objects to the server, thereby enabling the server to, by the server sending credentials relating to the set of multimedia objects and the access rights associated therewith and a resolved identity of the second communications device to the second communications device, allow the second communications device to access the set of multimedia objects and to manipulate the set of multimedia objects according to the access rights.

According to a sixth aspect there is provided a second communications device for allowing the second communications device to access a set of multimedia objects accessible by a first communications device, comprising communication means arranged to communicate identity code information with the first communications device and the server, wherein a representation of the identity code is communicated from one of the first communications device and the second communications device to the other of the first communications device and the second communications device and then from said other device to the server, the server thereby associating a specific first communications device with a specific second communications device, the server thereby associating a specific first communications device with a specific second communications device; and a receiver arranged to receive credentials relating to a set of multimedia objects accessible by the mobile phone and access rights associated therewith and a resolved identity of the second communications device from the server, the credentials thereby allowing the second communications device to access the set of multimedia objects and to manipulate the set of multimedia objects according to the access rights.

According to a seventh aspect there is provided a server for allowing a second communications device to access a set of multimedia objects accessible by a first communications device, comprising communication means arranged to communicate identity code information with the first communications device and the second communications device, wherein a representation of the identity code is communicated from one of the first communications device and the second communications device to the other of the first communications device and the second communications device 206 and then from said other device to the server, the server thereby associating a specific first communications device with a specific second communications device; a receiver arranged to receive information relating to a set of multimedia objects from the first communications device, the set of multimedia objects being accessible by the mobile phone; a processing unit arranged to generate credentials relating to the set of multimedia objects and access rights associated therewith; and a transmitter arranged to send the credentials to the second communications device, thereby allowing the second communications device to access the set of multimedia objects and to manipulate the set of multimedia objects according to the access rights.

According to an eight aspect there is provided a computer program product comprising software instructions that when downloaded to a computer is configured to perform a method according to any one of the methods as disclosed above.

The second, third, fourth, fifth, sixths, seventh and eight aspects may generally have the same features and advantages as the first aspect. Other objectives, features and advantages of the present invention will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Embodiments of the present invention will now be described in more detail by way of non-limiting examples, reference being made to the enclosed drawings, in which.

DETAILED DESCRIPTION OF PREFERRED EMBODIMENTS

The present invention will now be described more fully hereinafter with reference to the accompanying drawings, in which certain embodiments are shown. Like numbers refer to like elements throughout. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art.

Figure 1:
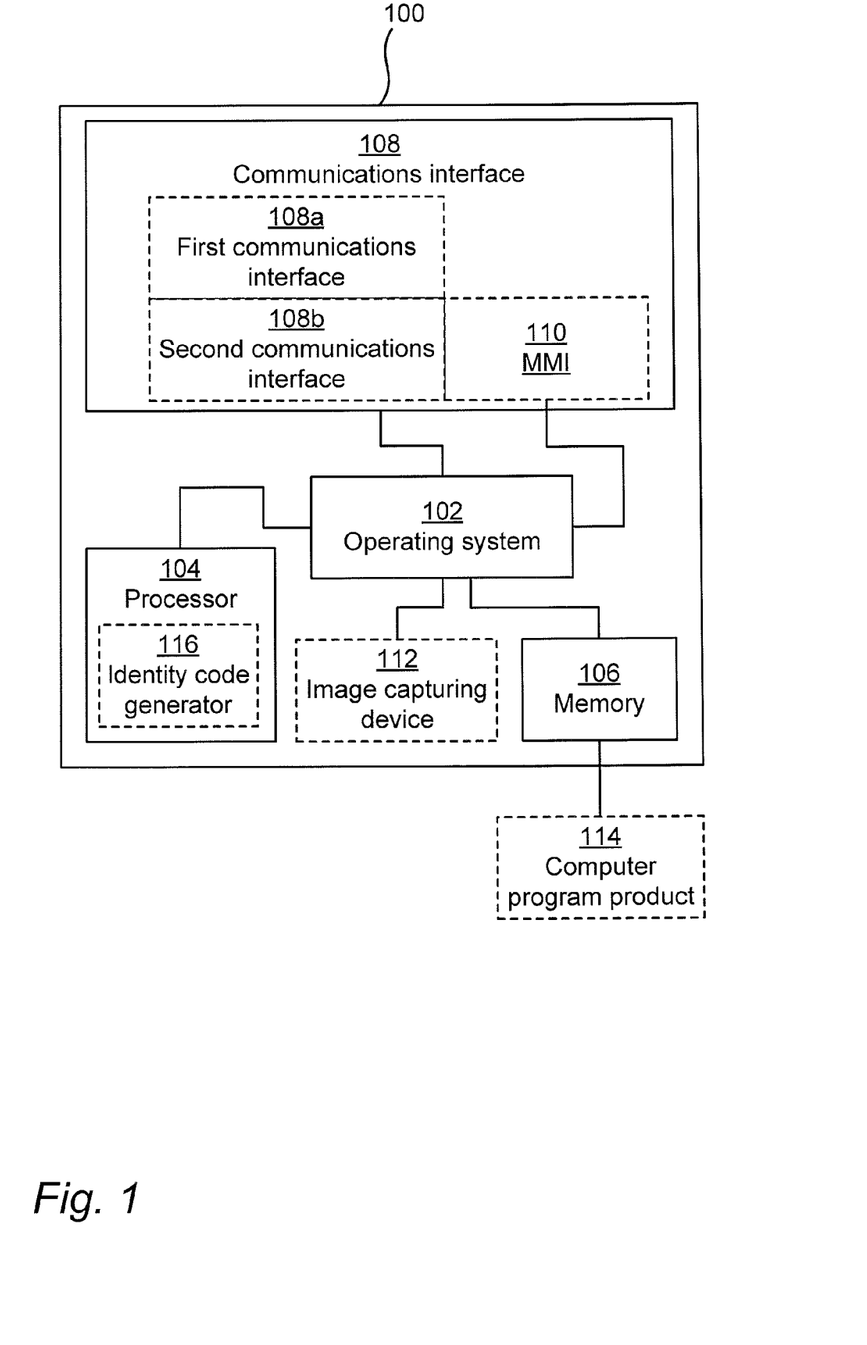
FIG. 1 is a schematic illustration of a communications device according to embodiments.

FIG. 1 is a schematic illustration of a communications device 100 according to an embodiment. The communications device 100 may be a computer (such as a stationary computer, a laptop computer, or tablet computer). The communications device 100 may alternatively be a personal digital assistant (PDA). The communications device 100 may yet alternatively be a mobile phone. The communications device 100 may even be a digital projector. The communications device 100 generally comprises circuitry arranged to perform a number of operations and will now be described in terms of functional blocks. In general, the functional blocks may be implemented in various ways, such as by programming one or more field programmable gate arrays (FPGAs), applications specified integrated circuits (ASICs), or the like.

The communications device 100 is run under supervision of an operating system 102 and comprises a processor functional block 104, which may be embodied as a central processing unit and/or a dedicated image processing unit, such as a JPEG hardware accelerator. The processor functional block 104 may also refer to a graphics processing unit (GPU), capable of calculations, such as pixel/fragment shaders in OpenGL/OpenCL. The image processing unit may be implemented as a computer program product comprising one or more software components, or as a dedicated hardware unit for image processing. The software components may comprise software instructions that when downloaded to a computer are configured to perform the instructions associated with the processing unit. The communications device 100 further comprises a memory functional block 106, which may be embodied as a memory or a computer-readable storage medium, such as a random access memory (RAM), a read-only memory (ROM), a universal series bus (USB) product, such as a memory stick, or the like. Particularly, the memory functional block 106 may hold a computer program product 114 comprising software instructions that, when downloaded to a computer, such as the communications device 100, and run on the processor 104 are configured to perform the subject matter disclosed herein. Alternatively, the software instructions may be separately distributable to be distributed in a network, see FIG. 2.

The communications device 100 further comprises a communications functional block 108, which may be embodied as a receiver and a transmitter and/or a transceiver, inter alia configured to receive input from, and deliver output to, a man-machine interface (MMI) functional block 110, another communications device, computer, or the like. Particularly, the communications functional block 108 may comprise a first communications interface 108a and a second communications interface 108b. The man-machine interface (MMI) functional block 110 may define a user interface. The user interface may be an integral part of the second communications interface 108b.

The communications device 100 may further comprise an identity code generator functional block 116 arranged to generate an identity code of the communications device 100. The identity code generator functional block 116 may be implemented in the processing unit of the processor functional block 104.

The communications device 100 may further comprise an image capturing unit 112, which may be embodied as a digital camera or the like. Alternatively the communications device 100 may be operatively coupled to an external image capturing unit or device (not shown) via the communications interface functional block 108.

The communications device 100 may have access to sets of digital images from which one or more digital images may be selected. Such digital images may originate from still images or from a video sequence, such as a video file, or from a video surveillance camera. The external image capturing unit may be coupled to the communications device 100 through an external network interface which may be either wired, or wireless, such as a 3G modem, or a WLAN.

Figure 2:
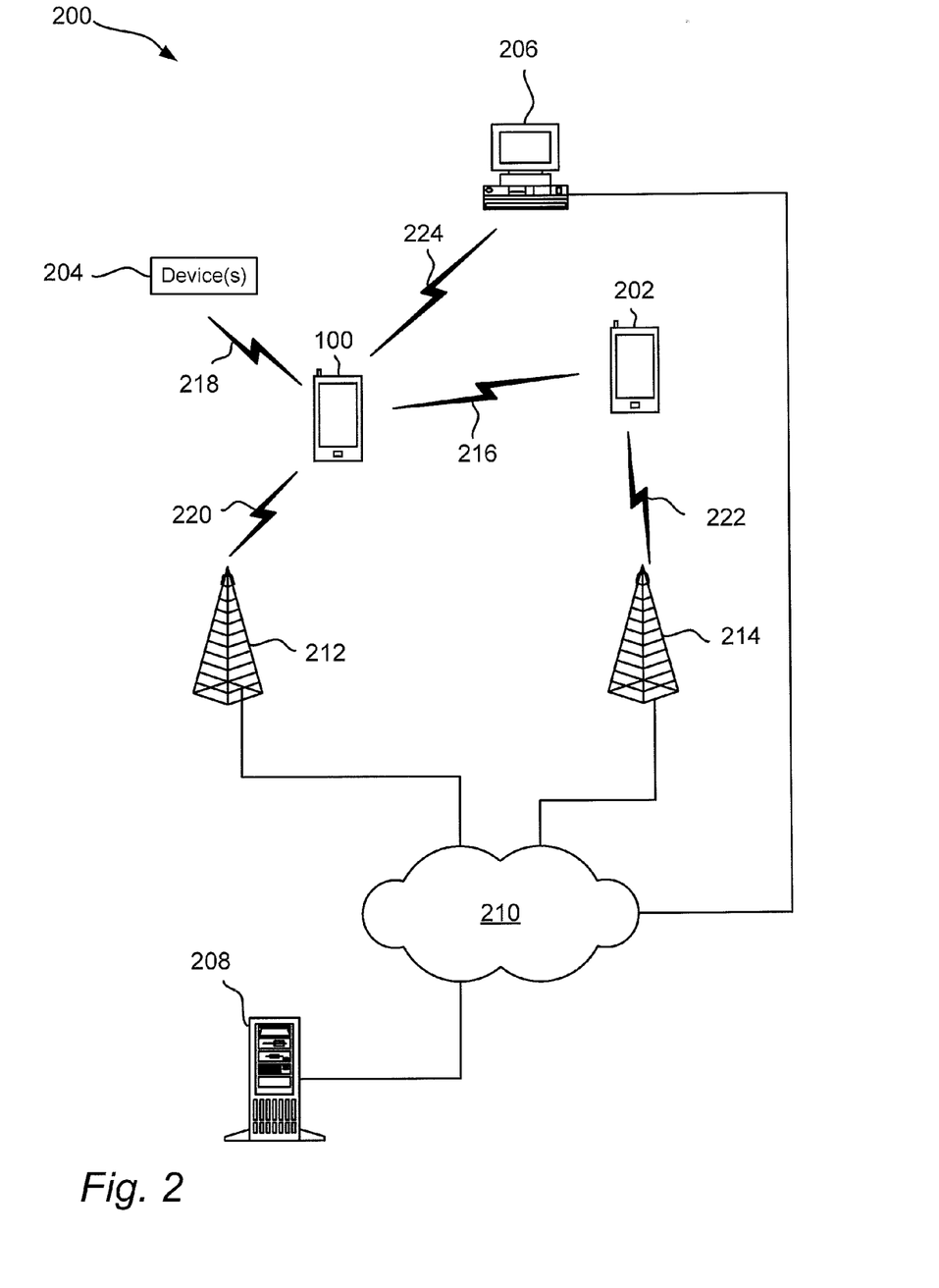
FIG. 2 is a schematic illustration of a communications system according to embodiments.

FIG. 2 illustrates an example of a communications system 200 in which embodiments of the disclosed subject matter may be applied. In the communications system 200 of FIG. 2, various data services such as cellular voice calls, www/wap browsing, cellular video calls, data calls, facsimile transmissions, music transmissions, still image transmissions, video transmissions, electronic message transmissions, electronic positioning information, and electronic commerce may be performed between the communications device 100 and other devices, such as one or more further communications devices 202, 204, 206, or a server 208. For different embodiments of the communications devices 100, 202, 204, 206 and in different situations relating to the operating conditions of the communications system 200, different ones of the data services referred to above may or may not be available; the disclosed subject matter is not limited to any particular set of services in this respect.

The communications devices 100, 202, 204, 206 may be arranged to be wirelessly operatively connected to a network 210 through radio frequency links 220, 222 via base stations 212, 214. The base stations 212, 214 are operatively connected to the network 210. The network 210 may be in compliance with any commercially available network standard, such as GSM, UMTS, D-AMPS, CDMA2000, FOMA, TD-SCDMA, IPv4, IPv6 and the like. The communications devices 100, 202, 204, 206 may also be arranged to be operatively connected to a network 210 by electric wires or optical fiber cables.

The network 210 may be an integrated part of the internet. A server 208, which may be an internet server, generally has a data storage and is operatively connected to the network 210. The server 208 may host a www/wap server capable of serving www/wap content to the communications devices 100, 202. The server 208 may also be a server for a general data service.

The communications device 100 may also be capable of communicating locally via a local link 218 to one or more local communications device(s) 204. The local link can be any type of link with a limited range, such as Bluetooth®, a Universal Serial Bus (USB) link, a Wireless Universal Serial Bus (WUSB) link, an IEEE 802.11 wireless local area network link, RS-232 serial link, and communications aided by the infrared data association (IrDA) standard, etc. The communications device 100 may similarly be capable of communicating locally via a local links 216, 224 to the one or more further communications devices 202, 206.

Figure 3A:
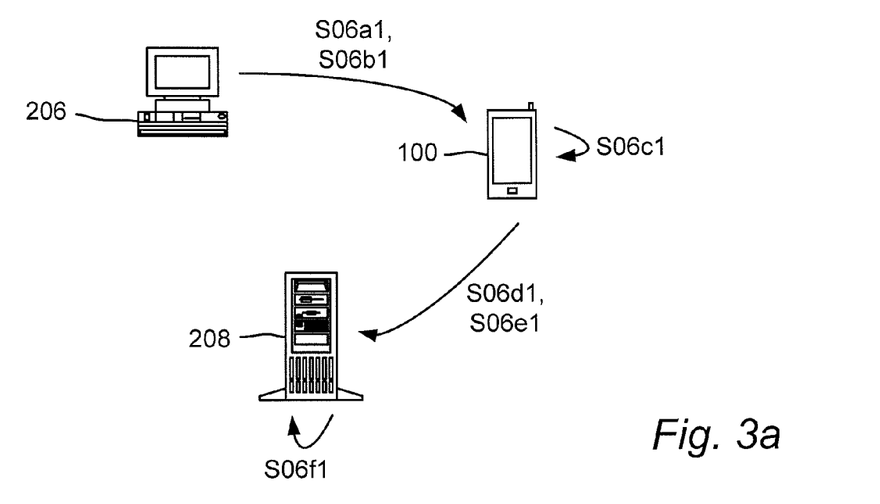
FIGS. 3a-d are schematic illustrations of (parts of) a communications system according to embodiments.
Figure 3B:
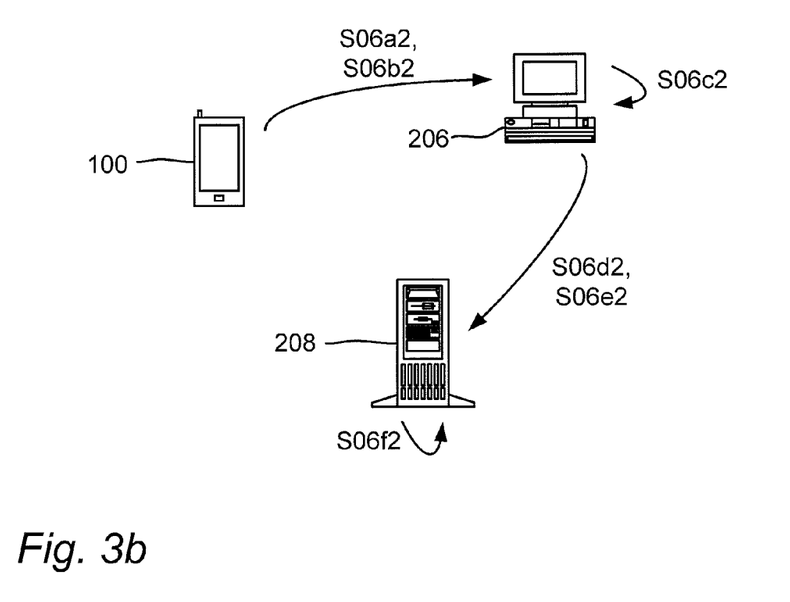
Figure 3C:
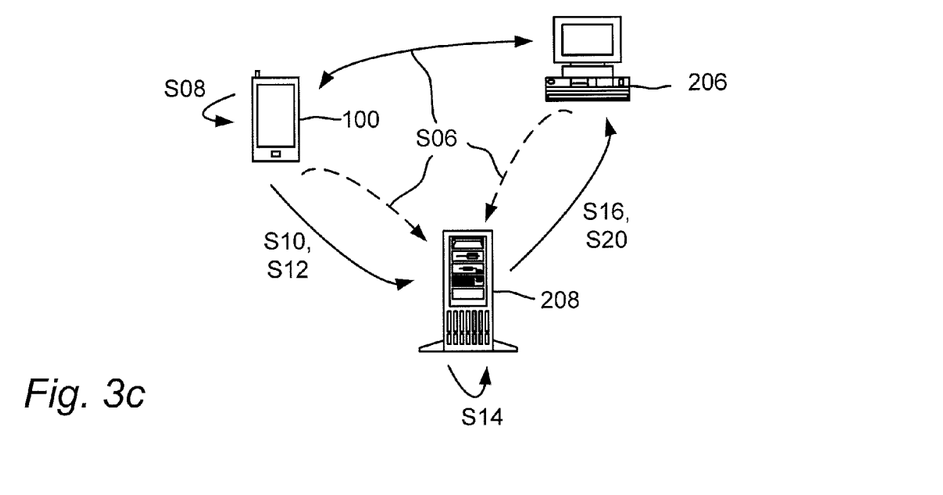
Figure 3D:
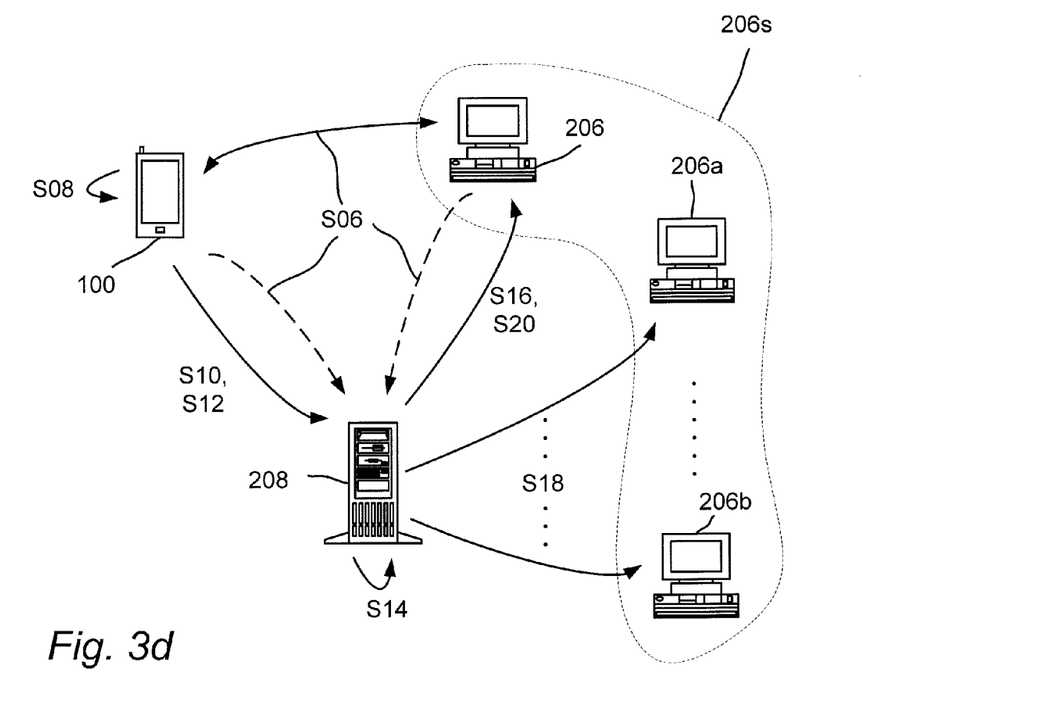
Figure 4A:
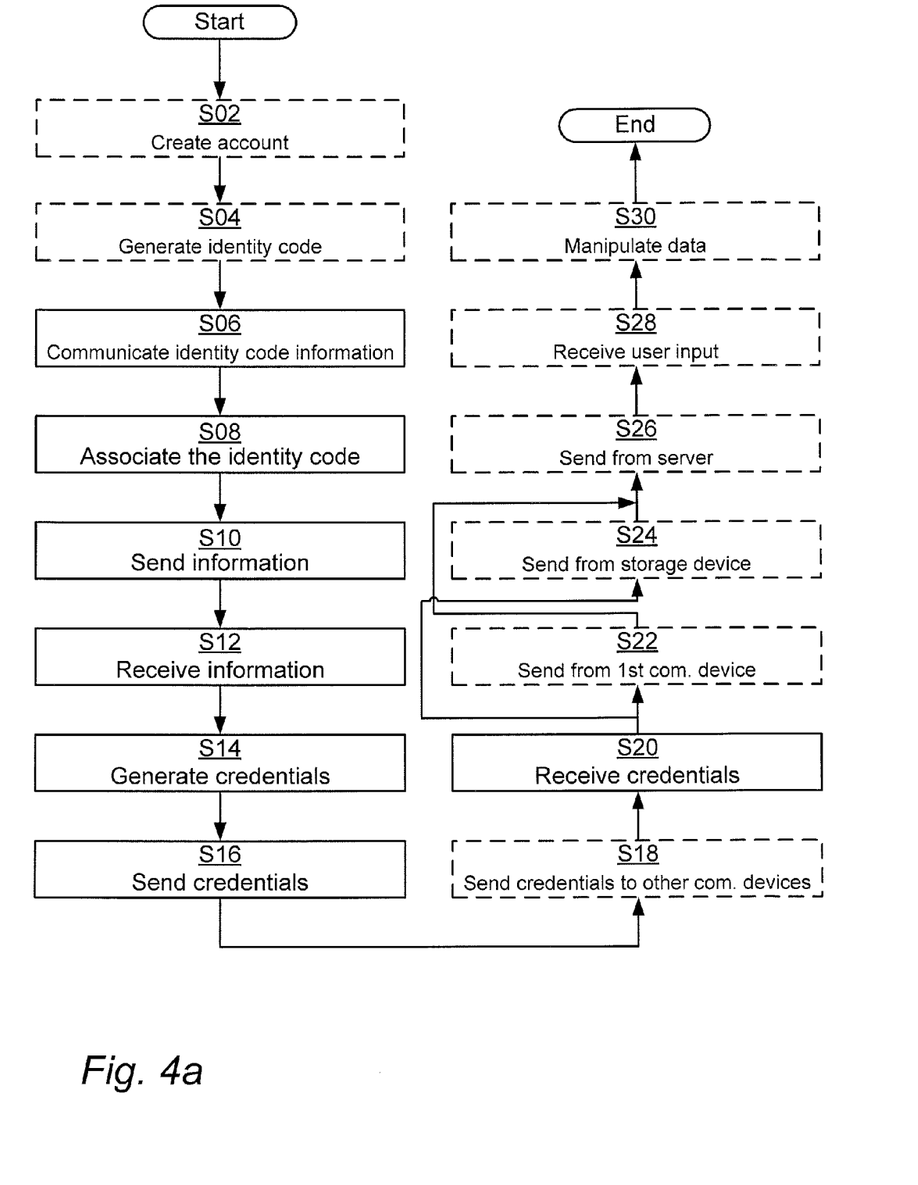
FIGS. 4a-c are flowcharts according to embodiments.
Figure 4B:
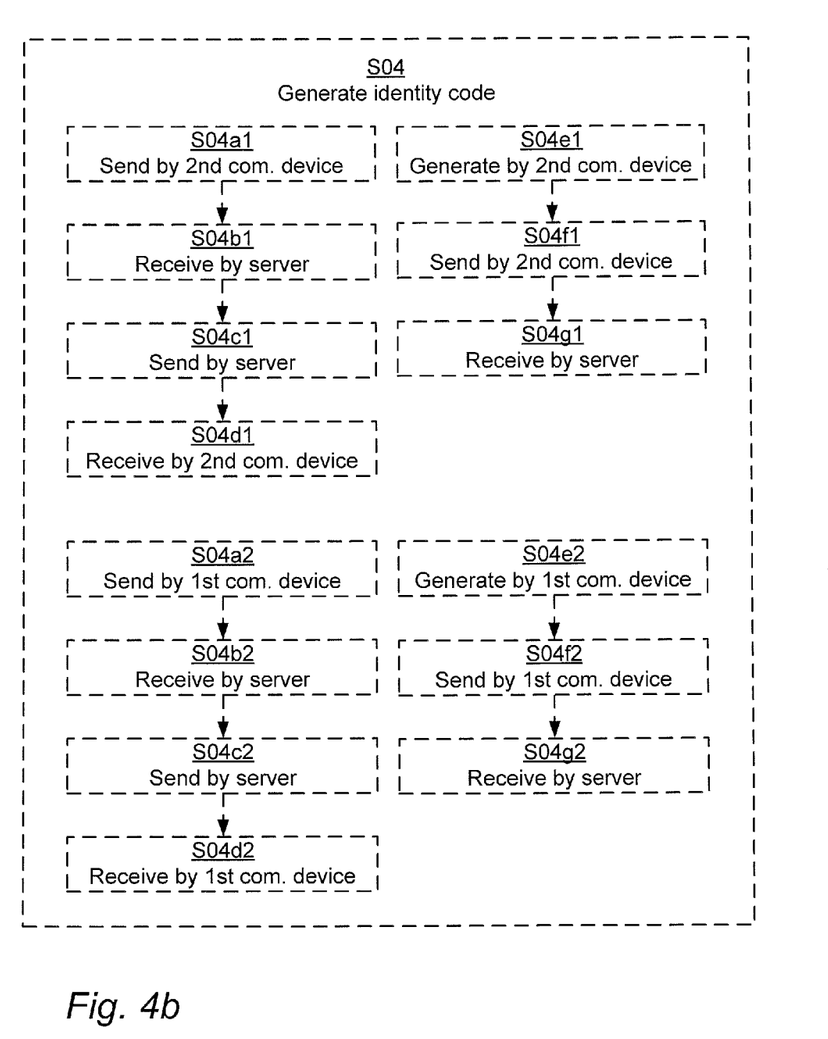
Figure 4C:
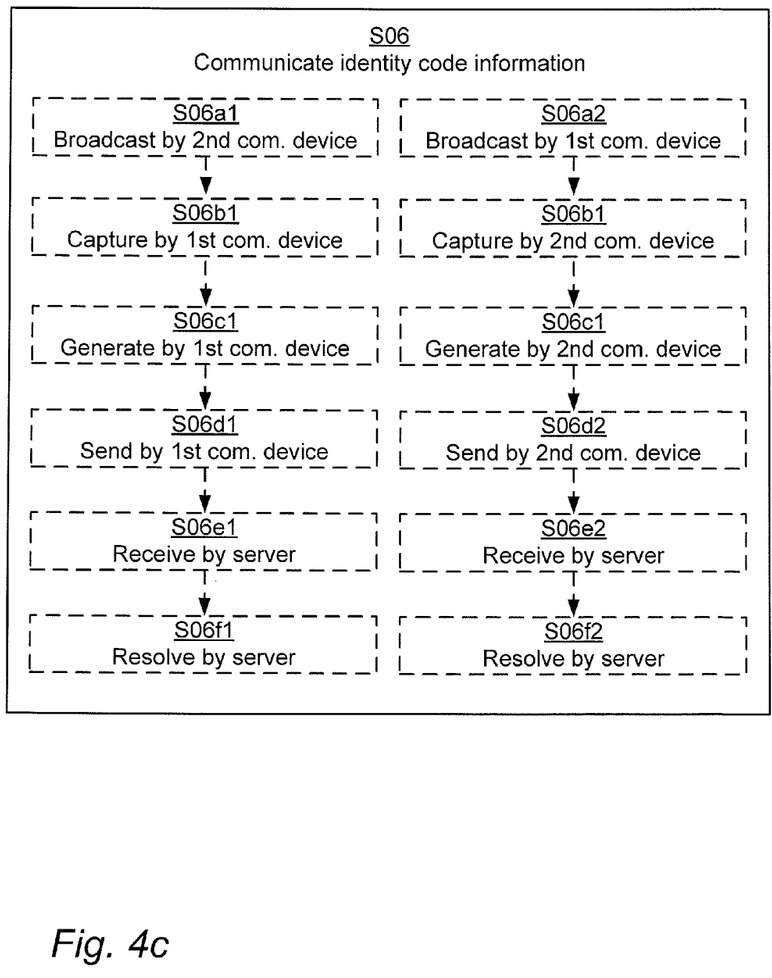

Methods and means for allowing one or more communications devices to access a set of multimedia objects accessible by another communications device will be described with references to FIGS. 1 and 2, FIG. 3a-d as well as the flowcharts of FIGS. 4a-c.

As will be further disclosed below, the presented embodiments are based on communicating identity code information between a transmitting device, a receiving device, and a server. In general, the transmitting device initiates communications by broadcasting the identity code (or a representation thereof) and the receiving device receives the identity code (or the representation thereof) being broadcast by the transmitting device. The embodiments will be disclosed with references to such a transmitting device and to such a receiving device. Each of the communications devices 100, 202, 204, 206 disclosed herein may act as both a transmitting device and a receiving device. In FIG. 3a the communications device 206 acts as the transmitting device and the communications device 101 acts as the receiving device. In FIG. 3b the communications device 206 acts as the receiving device and the communications device 100 acts as the transmitting device. FIGS. 3c and 3d illustrates a more general situation wherein one of the communications devices 100, 206 acts as the transmitting device whilst the other of the communications devices 100, 206 acts as the receiving device. Throughout the disclosure the communications device 100 will be denoted a first communications device and the communications device 206 will be denoted a second communications device.

An identity code may be broadcast from the transmitting device. The identity code, which may be embodied as a token, is arranged to identify the communications device from which it is broadcast. In order for the transmitting device to broadcast such an identity code the identity code must be generated, step S04. An identity code may be generated in many ways; in general the identity code may be generated by the server 208 or in an identity code generation functional block 116 of the communications device acting as the transmitting device. The disclosed embodiments are not limited to particular types of identity codes or how such identity codes are generated. Furthermore, the identity code itself may be associated with at least one from the group of audio data, tactile data, radio frequency data, picture data, video data.

For example, according to embodiments, the second communications device 206, when acting as the transmitting device, sends a request for an identity code to the server 208, step S04a1. For example, a user may type an URL in a web browser displayed on a communications interface of the second communications device 206, which request then triggers a HTTP request. Thus, the identity code may in particular be requested by the transmitting device by a triggered HTTP request. The server 208 then receives the request, step S04b1, and as a response thereto sends an identity code to the second communications device 206 acting as the transmitting device, step S04c1. Upon reception of the identity code by the second communications device 206, step S04d1, it has access to the identity code and thus can broadcast the identity code (or a representation thereof).

Correspondingly, the first communications device 100, when acting as the transmitting device, may send a request for an identity code to the server 208, step S04a2. The server 208 then receives the request, step S04b2, and as a response thereto sends an identity code to the first communications device 100 acting as the transmitting device, step S04c2. Upon reception of the identity code by the first communications device 100, step S04d2, it has access to the identity code and thus can broadcast the identity code (or a representation thereof).

Thus, according to embodiments the server 208 may generate the identity code. The identity code may uniquely identify the communications device acting as a transmitting device. In this context the term "uniquely" may be interpreted as at least one of uniquely in time or uniquely in space (i.e. location). The identity code may be unique during a predetermined period of time. This predetermined period of time may be one month, preferably 24 hours, more preferably 5 seconds to 5 minutes, even more preferably between 5 seconds and 2 minutes, and most preferably between 5 seconds and 1 minute. The identity code may uniquely identify the communications device as well as a data service associated with the communications device. In other words, the identity code may be embedded with data.

The thus generated identity code may be transmitted from the server 208 to the transmitting device via the network 210. The transmitting device may receive the identity code through the communications interface 108 and store the identity code in the memory 106. Alternatively, the server 208 may generate one or more parameters to an identity code and then transmit the parameters to the transmitting device. The transmitting device may then generate the identity code based on the received parameters and store the identity code in the memory 106. Alternatively the parameter(s) may be generated by the transmitting device itself. The transmitting device may then transmit the parameter(s) to the server 208, whereby the server may generated the identity code based on the received parameter(s). Yet alternatively the identity code (or the one or more parameters for generating such an identity code) may be generated by the local device 204 and then transmitted to the transmitting device (and then from the transmitting device to the server 208).

Alternatively, the generation of the identity code (or parameters relating to the identity code) may be initialised by the transmitting device which may request the server 208 to transmit an identity code (or parameters relating to the identity code) to the transmitting device. Alternatively the server 208 may transmit an identity code (or parameters relating to the identity code) to the transmitting device as the transmitting device enters a broadcast mode.

According to embodiments the communications device acting as the transmitting device may first generate the identity code, in one of steps S04e1 and S04e2, and then send the generated identity code (or information related thereto) to the server in one of steps S04f1 and S04f2. The identity code is then received by the server 208 in one of steps S04g1 and S04g2. The identity code may thus be generated by the transmitting device itself (i.e. independently of other parameters or data received from or generated by other devices). The identity code may be generated by the identity code generator 116 and then stored in the memory 106. In case the identity code is generated by the transmitting device, the transmitting device may transmit the identity code (or parameters thereof) to the server 208 through the communications interface 108 so that the server 208 may resolve the identity of the transmitting device from the received identity code. Thus, upon reception of the identity code by the server 208 the server 208 is able to associate the transmitting device with the identity code. Thus the identity code is related to the server 208 so that the server 208 later can identify the transmitting device by means of the identity code.

When having access to an identity code the communications device 100 (acting as the transmitting device) may enter a broadcast mode.

The data service may relate to a data service made available by one of the transmitting device and the receiving device. For example, the transmitting device or the receiving device may receive user instructions that a particular digital image is to be transmitted to and displayed on a display of a further device or that at least one further communications device should be granted access to download the particular digital image from a web server. The user instructions, which may be associated with the identity code, may be received before or after an indirect communications link has been established between the transmitting device and the receiving device.

In general, the data service may be associated with a user application of the first communications device 100. The user application may be provided as a computer program product comprising software instructions. The user application may be associated with an account to which there is associated multimedia content or other data accessible by the first communications device using a service provided by the server. The account may be created by the first communications device 100, in a step S02, for example when the user application is downloaded to and installed on the first communications device 100. The account may thus be associated with the server 208.

Account credentials are preferably stored in the first communications device 100. The credentials are preferably unique for this particular first communications device 100 and an account of the particular first communications device 100. Several first communications devices 100 could have access to a given account, but it may be preferred that each first communications devices 100 has its own unique credentials for accessing its respective account. A credential may also have a set of access rights associated therewith. These access rights determine what level of access a given communications device may have to data associated with the account. As will be further described below, access rights may allow the given communications device only to read content, or to read and write content. The access rights may also pertain to administrative rights that for example permits the transfer of new credentials to further communications devices (as is further explained in relation to FIG. 3d). The access rights may expire after a given period of time. Preferably the server 208 has knowledge of which credentials that are valid, which access rights the credentials are associated with, and to which account the credentials are associated with by communications with the communications devices being associated with the credentials.

The set of multimedia objects may belong to the multimedia content. The data may for example be related to multimedia content, such as digital images, audio clips, movie clips, or the like. The multimedia content may be related to Internet services, such as personal web albums or the like. As an example, multimedia objects may be associated with at least one from a Facebook® account, a Picasa account, a MySpace account, a Flicr account, a Jalbum account, and a Dropbox account, an Amazon s3 storage account, or a personal FTP account. These accounts may be associated with the user application (and hence with the first communications device 100) when the user application is installed on the first communications device 100. For example, during installation of the user application the user of the first communications device 100 may interact with the user application and indicate which accounts of the first communications device 100 that are to be associated with the user application. As an example the data service may thus relate to digital images in a personal web album accessible by the first communications device 100. The data service may also be related to data files, instructions for the processing unit, device settings, or a password for accessing a service and/or a device. The data service may be associated with the user application for example when the user application is installed on the first communications device 100. The data may also be associated with contact information, such as information stored in a phonebook database of the first communications device 100. As an example the data service may relate to a request pertaining to additional information relating to an information post in the phonebook database of the first communications device 100. The data service may also relate to initiation of payment transactions between the first communications device 100 and a further device. In conclusion, the disclosed subject matter may therefore enable easy photo sharing from device to device: from mobile phone to mobile phone, from mobile phone to TV, contact sharing, initiation of payment transactions, and so on.

Any data associated with the data service may be hosted by the server 208. Alternatively such data may be hosted by the first communications device 100. Yet alternatively the data such data may be hosted by the at least one further communications device. In summary, an account may be created on the first communications device 100, which account associates multimedia content or a data service accessible by on the first communications device 100 with a service provided by the server 208.

As noted above the identity code may be associated with at least one from the group of audio data, tactile data, radio frequency data, picture data. According to preferred embodiments the second communications interface may therefore be one from the group of an audible, a tactile, a WiFi and a picture based communications interface. The identity code is preferably broadcast by means of a non-radio frequency communications interface of the communications device acting as the transmitting device. The non-radio frequency communications interface may be a user interface of the communications device acting as the transmitting device, where user interface output itself defines code.

In case the identity code is associated with audio data the identity code may be broadcast as a sound through an audio communications interface of the communications device acting as the transmitting device. The identity code may for example be embodied as a melody, wherein parameters of the identity code defines the tones of the melody. Particularly, the identity code may be associated with a ring tone of the communications device acting as the transmitting device. Broadcasting the identity code may then be performed by outputting the melody through an audio communications interface, such as a speaker. In general, if audible to a human being (e.g. having a frequency content in the interval 20 to 20 000 Hz) it may be required that the identity code is generated based on basic principles of music such that the outputted melody is pleasant to the human ear. This requirement may not be imposed if the frequency content is below 20 Hz (corresponding to a low frequency identity code) or above 20 000 Hz (corresponding to a high frequency identity code). The broadcast by means of audio communications may allow a communications device acting as the receiving device to receive the broadcast identity code by means of audio detecting circuitry, such as a microphone.

In case the identity code is associated with tactile data the identity code may be broadcast as a tactile signal through a tactile communications interface of the communications device acting as the transmitting device. The tactile signal may be associated with a vibration pattern. For example, the identity code may be outputted as a coded vibration signal. The identity code may determine properties of the vibration pattern. This may allow the communications device acting as the receiving device to receive the broadcast identity code by means of vibration detecting circuitry.

In case the identity code is associated with picture data the identity code may be broadcast as a picture through a picture communications interface of the communications device acting as the transmitting device. The picture data may represent a QR code. Alternatively the picture data may be associated with a picture having been captured, received, or generated by the communications device acting as the transmitting device. The communications device acting as the transmitting device may thus be arranged to receive picture data and to generate the identity code based on the received picture data. For example, the identity code may be based on the background picture displayed on a vision-based user interface of the communications device acting as the transmitting device. The background picture may be part of a web page displayed by the communications device acting as the transmitting device. A user may define the picture data which is to be associated with the identity code to be broadcast. The picture data may for example correspond to a blurry background picture. This may allow the communications device acting as the receiving device to receive the broadcast identity code by means of image capturing (i.e. by means of image receiving circuitry, such as a camera). Specifically, the communications device acting as the receiving device may be arranged to capture an image of the blurry background picture by means of image capturing circuitry pre-set to blurry focus, whereby the image capturing circuitry blurs away details of text and other data displayed in front of the blurry background. The background picture may comprise two or more coloured fields. Properties such as dimension, location and/or colour of the fields may thereby define the identity code. The identity code may also be broadcast as a sequence of flashing colours where the pattern, for example in terms of lengths and colours of the flashes, determines the identity code.

The identity code may also be transmitted through a radio frequency communications interface of the communications device acting as the transmitting device. For example, the identity code may be broadcast using the Bluetooth® standard where the broadcast message may comprise the International Mobile Equipment Identity (IMEI) as the identity code. Alternatively the broadcast message may comprise a separate identity code separated from the IMEI. In similar way the identity code may be broadcast using WiFi. These type of identity codes may already be known by the server. As disclosed below the receiving device intended to receive the broadcast from the transmitting device does not acknowledge the transmitting device the reception of the broadcast message. In contrast to the communications protocol of the normal Bluetooth® standard there is according to the disclosed subject matter therefore no direct pairing between the transmitting device and the receiving device. In other words, the transmitting device and the receiving device do not utilize mutual two-way communications (which in turn enables a direct communications channel between them). The communications channel between the transmitting device and the receiving device may therefore be said to be indirect.

In general, the identity code to be broadcast may have embedded error correction properties. Error protection may be embedded by means of repetition patterns or by code, such as convolutional codes. The broadcast of the identity code may be encrypted (by using RSA, public key encryption, Diffie-Hellman key exchange, algorithms based on elliptic curves or the like) and it may comprise a digital signature of the transmitting device.

The broadcasted message/id or parts thereof may comprise a public key according to RSA, Diffie-Hellman key exchange, or other PKE standards to further reduce the latency if the communication between the transmitting device and the receiving device is to be encrypted and/or signed. In such way, the receiving device may immediately encrypt or sign its traffic to the transmitting device. The server and the transmitting device and the receiving device may synchronize their keys such that that the server knows exclusively the public keys of the transmitting device and the receiving device. The server may thereby not be able to interpret the data content (i.e. data relating to the payload) of the communication. Alternatively the server may have access to also the private keys of the transmitting device and the receiving device for a particular session, and thus can receive as well as interpret the communication. The transmitting device and the receiving device may alternatively utilize the servers' public key to enable communication with the server.

The broadcast of the identity code is in general intended to be received by at least one receiving device. But by nature of any broadcast-type transmission the transmitting device does not necessary "know" that the receiving device even exists. In order for the receiving device to receive the broadcast from the transmitting device it may be required that the receiving device has entered a receiving mode.

Thus, in general, identity code information is, in a step S06, communicated between the first communications device 100, the second communications device 206 and the server 208, where one of the first communications device 100 and the second communications device 206 acts as the transmitting device and the other of the first communications device 100 and the second communications device 206 acts as the receiving device. In more detail, a representation of the identity code is communicated from the one of the communications devices 100, 206 that is acting as the transmitting device to the one of the communications devices 100, 206 that is acting as the receiving device and then from the one of the communications devices 100, 206 that is acting as the receiving device to the server 206. The server 208 is thereby able to associate a specific one of the communications devices 100, 206 that is acting as the transmitting device with a specific one of the communications devices 100, 206 that is acting as the receiving device.

According to an embodiment, as illustrated in FIG. 3a, the second communications device 206 acts as the transmitting device and, in a step S06a1, broadcasts a representation of its identity code. In this case the identity code thus pertains to identification of the second communications device 206.

The first communications device 100 acts as the receiving device and captures a perceived version of the broadcast representation of the identity code, step S06b1. As noted above, depending on the means of broadcasting the representation of the identity code by the second communications device 206 the first communications device 100 may have the corresponding means of capturing the representation of the identity code. The first communications device 100 generates a received identity code based on the captured perceived version of the broadcast representation of the identity code, step S06c1. The first communications device 100 sends the received identity code to the server 208, step S06d1, which thus receives the identity code, step S06e1. The first communications device 100 may also provide the server 208 with explicit identity information of the first communications device 100, for example identity information relating to the first communications device's 100 account for the user application. Upon reception of the identity code the server resolves the identity of the second communications device 206 by analyzing the received identity code, step S06f1.

According to another embodiment, as illustrated in FIG. 3b, the first communications device 100 acts as the transmitting device and, in a step S06a2, broadcasts a representation of its identity code. In this case the identity code thus pertains to identification of the first communications device 100. The second communications device 206 acts as the receiving device and captures a perceived version of the broadcast representation of the identity code, step S06b2. As noted above, depending on the means of broadcasting the representation of the identity code by the first communications device 100 the second communications device 206 may have the corresponding means of capturing the representation of the identity code. The second communications device 206 generates a received identity code based on the captured perceived version of the broadcast representation of the identity code, step S06c2. The second communications device 206 sends the received identity code to the server, step S06d2, which thus receives the identity code, step S06e2. The second communications device 206 may also provide the server 208 with explicit identity information of the second communications device 206, for example identity information relating to the second communications device's 206 account for the user application. Upon reception of the identity code the server resolves the identity of the first communications device 100 by analyzing the received identity code, step S06f2.

The generation of the received identity code based on the captured perceived version of the broadcast representation of the identity code may involve decoding the captured perceived version of the broadcast representation of the identity code. It may further involve extracting the identity code from the decoded captured perceived version of the broadcast representation of the identity code.

The identity code is validated by the server 208 to resolve the identity of the transmitting device. Since the server 208 has exchanged identity code information with the transmitting device upon generation of the identity code the server 208 is able to, based on identity code as received by the receiving device, decide which transmitting device the received identity code belongs to.

As noted above, the receiving device receives the broadcast from the transmitting device without acknowledging the transmitting device the reception thereof. Thus, during initialisation there is no direct two-way communications link established between the transmitting device and the receiving device. As also noted above, instead of transmitting an acknowledging message to the transmitting device the receiving device transmits to the server 208 a confirmation message relating to the reception of the broadcast message comprising (a representation of) the identity code by the receiving device. The confirmation message preferably comprises information relating to the detected identity code of the transmitting device as well as the identity of the receiving device.

Once identity code information has been received by, or generated by, the first communications device 100, the first communications device 100 associates the identity code or the representation thereof with a data service, such as a set of multimedia objects, step S08. As will be further disclosed below the data associated with the data service may be stored either in the first communications device 100 or remotely from the first communications device 100. But regardless of the physical location at which the data associated with the data service is stored, the data associated with the data service is accessible by the first communications device 100.

As will also be further disclosed below data associated with the data service will be made accessible by the second communications device 206. The data associated with the data service is therefore associated with the above defined access rights. The access rights thus generally pertain to how the second communications device 206, upon access to the data associated with the data service, may manipulate this data. Specifically, if the data associated with the data service is represented by a set of multimedia objects the access rights may correspond to at least one property from read-only the set of multimedia objects, read and write the set of multimedia objects, deletion of the set of multimedia objects, changing of properties of the set of multimedia objects, and further forwarding of the set of multimedia objects being disabled. Hence, depending on the access rights the second communications device 206 may be able to read and/or write the set of multimedia objects, delete the set of multimedia objects, change properties of the set of multimedia objects, and/or further forward the set of multimedia objects.

Information relating to the data associated with the data service is therefore sent from the first communications device 100 to the server 208, step S10. The server 208 thus receives the information relating to the data associated with the data service from the first communications device 100, step S12.

Upon reception of this information and upon reception of the identity code from either the first communications device 100 or from the second communications device 206 the server 208, in a step S14, generates credentials relating to the data associated with the data service and the access rights associated therewith. The credentials are based on the association of the specific first communications device 100 with the specific second communications device 206. The credentials allow the second communications device 206 to access the data associated with the data service and to manipulate the data associated with the data service according to the access rights. The credentials may thereby be used for authentication of the second communications device 206. According to an embodiment the credentials are represented as a hash key. Preferably each hash key is unique.

The thus generated credentials are then sent from the server 208 to the second communications device 206, step S16. According to an embodiment the server 208 sends first unvalidated credentials to the second communications device 206 inter alia when sending the identity code to the second communications device 206, step S04c1, if the identity code is sent to the second communications device 206. The credentials generated by the server 208 enable validation of the first unvalidated credentials.

Upon reception of the credentials, step S20, the second communications device 206 may then access and manipulate the data associated with the data service according to the access rights as disclosed above.

As noted above the data associated with the data service may be stored on the first communications device 100. In such a case the data associated with the data service or links thereto may be sent from the first communications device 100 to the server 208, step S22. The server 208 may then send the data associated with the data service or links thereto to the second communications device 206, step S26, so that the second communications device 206 may access and manipulate the data associated with the data service.

Alternatively, the data associated with the data service is stored on the server 208. In such a case the data associated with the data service or links thereto may be sent directly from the server 208 to the second communications device 206, step S26, so that the second communications device 206 may access and manipulate the data associated with the data service.

Yet alternatively the data associated with the data service is stored on a storage device physically separated from the first communications device 100 and the server 208. The data associated with the data service or links thereto may then be sent from the storage device to the server 208, step S24, and then from the server 208 to the second communications device 206, step S26, so that the second communications device 206 may access and manipulate the set of multimedia objects. The transmission of the data associated with the data service or links thereto from the storage device to the server 208 may be initiated by either the first communications device 100 or the server 208.

When the second communications device 206 has access to the data associated with the data service, the data associated with the data service may be manipulated on the second communications device 206 for example by means of the first communications device 100. Particularly, the first communications device 100 may be arranged to, in a step S28, receive user input relating to such manipulations. In response to receiving this user input the first communications device 100 generates a set of control signals which set is sent to the second communications device 206. A user of the first communications device 100 may thereby, in a step S30, manipulate the data associated with the data service on the second communications device 206. The set of control signals are advantageously sent to the second communications device 206 from the first communications device 100 via the server 208 but can also be sent directly to the second communications device 206.

As illustrated in FIG. 3d, there may be more than one second communications device 206 in the system. In FIG. 3d, two further second communications devices are illustrated at reference numerals 206a and 206b. Particularly, the above denoted second communications device 206 may thus be a first second communications device 206 from a set of associated second communications device 206s. There may be different ways to associate the set of associated second communications device 206s. For example, the set of associated second communications device 206s may be defined as associated when being operatively connected to the same local area network, or when being physically located within a predetermined area. The set of associated second communications device 206s may also be defined as associated when having at least a subset of a digital social network in common with the first communications device 100. An example of such a digital social network is Facebook®, and an example of such a subset is a common Facebook® group.

There may be situations when a first communications device 100 would like to send credentials to a group of second communications device and being able to broadcast commands and notifications to these same group of second communications devices. In the system of FIG. 3d it may thus be desirable to allow also the associated second communications device 206s to access and manipulate the set of multimedia objects. Information relating to the association between the first second communications device 206 and the remaining associated second communications device 206a, 206b in the set of associated second communications device 206s may be stored in the server 208. The server 208 may therefore, in a step S18, also send the credentials to the remaining second communications device 206a, 206b in the set of associated second communications device 206s. Thereby the remaining second communications device 206a, 206b are also allowed to access the data associated with the data service and to manipulate the data associated with the data service according to the access rights. The set of second communications devices 206s may thus be associated in different manners and thereby virtue of the association automatically be allowed access to the data associated with the data service according to the access rights when a first of the set of second communications devices 206s has been allowed access to the contents.

Alternatively the first communications device 100 intending to provide the set of second communications devices 206s access to the contents acts as the transmitting communications device and the set of second communications devices 206s act as a receiving devices. The first communications device 100 thus broadcasts its identity code. Each one of the second communications devices 206s wanting to establish communication with the first communications device 100 may then be able to receive credentials to individually access the content of the first communications device 100 by capturing and sending the identity code as broadcast by the first communications device 100 back to the server 208.

An exemplary scenario where the disclosed embodiments may readily apply will now be described. According to this scenario a first communications device 100 acts as the receiving communications device and intends to provide a second communications device 206 acting as a transmitting device with contents. In this exemplary scenario the contents is represented by digital images associated with a Facebook® account. During installation of the user application the user may thus indicate that the Facebook® account should be associated with the user application. The pairing mechanism between the first communications device 100 and the second communications device 206 starts by issuing a public hash key corresponding to an identity code of the second communications device 206. This identity code is issued by the server 208, and is according to this scenario unique. Thus, according to this exemplary scenario no other identity code issued before or after this will be the same. The identity code is issued by request of a web client run on the second communications device 206. The second communications device 206, by means of the web client, thus requests the identity code. Upon reception of the identity code the second communications device 206 broadcasts the identity code as a QR code and then waits (for example by using an open long lived connection) for the server 208 to validate the identity code. If a pre-determined time period has passed without the server 208 validates the identity code, the identity code will be rendered invalid and a new identity code must be requested. The first communications device 100 records the broadcast identity code by capturing an image of the QR code and associates the recorded identity code with a set of images in the Facebook® account accessible by the first communications device 100. The set of images are then associated with access rights enabling the second communications device 206 associated with the broadcast identity code only to read (but not write) the set of images. The access rights are then provided with a digital signature and this information is then together with information relating to the captured QR code sent from the first communications device 100 to the server 208, for example by using a signed call. The server 208 then validate the signature sent by the first communications device 100, and if it is found to be correct, the server 208 sends a new set of unique credentials to the web client that allows the second communications device 206 to access the set of images specified by the first communications device 100. Because of the access right to read (but not write) the set of images the set of images may thereby be displayed on a display of the second communications device 206.

The set of new credentials may also be time limited, meaning that the new credentials may be rendered invalid after a given amount of time. Thus, besides the credential transfer between the first communications device 100 and the second communications device 206, the server 208 has now also established a communication channel between the first communications device 100 and the second communications device 206. This communication channel (which may be based on the comet specification), can be used to issue commands and notifications between the first communications device 100 and the second communications device 206. This may enable applications such as a remote controller for navigating the browser using the device.

The invention has mainly been described above with reference to a certain examples. However, as is readily appreciated by a person skilled in the art, other examples than the ones disclosed above are equally possible within the scope of the invention, as defined by the appended patent claims.

The invention claimed is:

1. A method in a first communications device, comprising:
   receiving, by the first communications device, an identity code from a second communications device to access by the second communications device multimedia objects being stored in the first communications device, wherein the identity code is unique during a predetermined period of time, wherein a representation of the identity code is communicated from the second communications device to the first communications device over a first communication interface, the first communication interface being one of an audio interface or a picture-based interface;
   transmitting the identity code from said first communications device to a server over a second communication interface for resolving the identity of the second communications device and associating the first communications device with the second communications device;
   associating, by the first communications device, the identity code or the representation thereof with a set of multimedia objects being stored in the first communications device, the set of multimedia objects being associated with access rights; and
   sending, by the first communications device, access information relating to the access rights to access the set of multimedia objects to the server, thereby enabling the server to, by the server generating credentials relating to the set of multimedia objects and the access rights associated therewith and sending the credentials relating to the set of multimedia objects and the access rights associated therewith and the resolved identity of the second communications device to the second communications device, allow the second communications device to access and display the set of multimedia objects stored in the first communications device and to manipulate the set of multimedia objects according to the access rights.

2. The method claim 1, wherein communicating identity code information comprises:
   broadcasting, by the second communications device, the representation of the identity code, the identity code pertaining to identification of the second communications device;
   capturing, by the first communications device, a perceived version of the broadcast representation of the identity code and generating a received identity code based on the captured perceived version of the broadcast representation of the identity code;
   sending, by the first communications device, the received identity code to the server;
   receiving, by the server, the received identity code; and
   resolving, by the server, the identity of the second communications device by analyzing the received identity code.

3. The method of claim 2, wherein the method prior to the step of broadcasting the representation of the identity code further comprises:
   sending, by the second communications device, a request for the identity code to the server;
   receiving, by the server, the request;
   sending, by the server, the identity code to the second communications device; and
   receiving, by the second communications device, the identity code.

4. The method of claim 2, wherein the method prior to the step of broadcasting the representation of the identity code further comprises:
   generating, by the second communications device, the identity code;
   sending, by the second communications device, the identity code to the server; and
   receiving, by the server, the identity code.

5. The method of claim 2, further comprising:
   sending, by the server, first unvalidated credentials to the second communications device when sending the identity code to the second communications device; and
   wherein the credentials sent by the server enable validation of the first unvalidated credentials.

6. The method of claim 1, wherein the access rights correspond to at least one property from read-only the set of multimedia objects, read and write the set of multimedia objects, deletion of the set of multimedia objects, changing of properties of the set of multimedia objects, and further forwarding of the set of multimedia objects disabled.

7. The method of claim 1, wherein the identity code is requested by the first communications device or the second communications device by a triggered HTTP request.

8. The method of claim 1, further comprising:
   receiving user input by the first communications device; and in response thereto manipulating, by the first communications device, the set of multimedia objects on the second communications device by sending a set of control signals associated therewith to the server.

9. The method of claim 1, wherein the second communications device is a first second communications device from a set of associated second communications devices, the method further comprising:
sending, by the server, the credentials to the remaining second communications device in the set of associated second communications device, thereby allowing the remaining second communications device to access the set of multimedia objects and to manipulate the set of multimedia objects according to the access rights.

10. The method of claim 9, wherein the set of associated second communications devices is defined as associated when being operatively connected to the same local area network.

11. The method of claim 9, wherein the set of associated second communications devices is defined as associated when being physically located within a predetermined area.

12. The method of claim 9, wherein the set of associated second communications devices is defined as associated when having a group of a digital social network in common with the first communications device.

13. A method in a specific second communications device, comprising:
communicating an identity code with a specific first communications device and a server, wherein the identity code is unique during a predetermined period of time, wherein a representation of the identity code is communicated from the specific second communications device to the specific first communications device over a first communication interface to access multimedia objects being stored in the specific first communications device, the first communication interface being one of an audio interface or a picture-based interface, enabling said specific first communications device to associate the identity code or the representation thereof with a set of multimedia objects being stored in the first specific communications device, the set of multimedia objects being associated with access rights, and send the identity code and access information relating to the access rights to access the set of multimedia objects, to the server over a second communication interface, the server thereby resolving the identity of the specific second communications device, associating the specific first communications device with the specific second communications device, and generating credentials relating to the set of multimedia objects and the access rights associated therewith; and
receiving, from the server, the credentials relating to the set of multimedia objects being stored in the specific first communications device and the access rights associated therewith and the resolved identity of the specific second communications device, the credentials thereby allowing the specific second communications device to access and display the set of multimedia objects stored in the specific first communications device and to manipulate the set of multimedia objects according to the access rights.

14. A method in a server, comprising:
communicating an identity code with a first communications device and a second communications device, wherein the identity code is unique during a predetermined period of time, wherein a representation of the identity code is communicated from the second communications device to the first communications device over a first communication interface to access multimedia objects being stored in the first communications device, the first communication interface being one of an audio interface or a picture-based interface, enabling said first communications device to associate the identity code or the representation thereof with a set of multimedia objects being stored in the first communications device, the set of multimedia objects being associated with access rights, and then from said first communications device to the server over a second communication interface, the server thereby resolving the identity of the second communications device and associating the first communications device with the second communications device;
receiving access information relating to the access rights to access the set of multimedia objects being stored in the first communications device, the set of multimedia objects being accessible by the first communications device;
generating credentials relating to the set of multimedia objects and the access rights associated therewith; and
sending the credentials and the resolved identity of the specific second communications device to the second communications device, thereby allowing the second communications device to access and display the set of multimedia objects being stored in the first communications device and to manipulate the set of multimedia objects according to the access rights.

15. A first communications device, comprising:
a receiver configured to receive an identity code from a second communications device to access by the second communications device multimedia objects being stored in the first communications device, wherein the identity code is unique during a predetermined period of time, wherein a representation of the identity code is communicated from the second communications device to the first communications device over a first communication interface, the first communication interface being one of an audio interface or a picture-based interface;
a transmitter configured to transmit the identity code from said first communications device to a server over a second communication interface, for resolving the identity of the second communications device and associating the first communications device with the second communications device;
a processing unit configured to associate the identity code or the representation thereof with a set of multimedia objects being stored in the first communications device, the set of multimedia objects being associated with access rights; and
a transmitter configured to send access information relating to the access rights to access the set of multimedia objects to the server, thereby enabling the server to, by the server generating credentials relating to the set of multimedia objects and the access rights associated therewith and sending the credentials relating to the set of multimedia objects and the access rights associated therewith and the resolved identity of the second communications device to the second communications device, allow the second communications device to access and display the set of multimedia objects stored in the first communications device and to manipulate the set of multimedia objects according to the access rights.

16. A specific second communications device, comprising:
- a communications interface configured to communicate an identity code with a specific first communications device and a server, wherein the identity code is unique during a predetermined period of time, wherein a representation of the identity code is communicated from the specific second communications device to the specific first communications device over a first communication interface to access multimedia objects being stored in the specific first communications device, the first communication interface being one of an audio interface or a picture-based interface, enabling said specific first communications device to associate the identity code or the representation thereof with a set of multimedia objects being stored in the first specific communications device, the set of multimedia objects being associated with access rights, and send the identity code and access information relating to the access rights to access the set of multimedia objects, to the server over a second communication interface, the server thereby resolving the identity of the specific second communications device, associating the specific first communications device with the specific second communications device, and generating credentials relating to the set of multimedia objects and the access rights associated therewith; and
- a receiver configured to receive, from the server, the credentials relating to the set of multimedia objects being stored in the specific first communications device and the access rights associated therewith and the resolved identity of the specific second communications device, the credentials thereby allowing the specific second communications device to access and display the set of multimedia objects stored in the specific first communications device and to manipulate the set of multimedia objects according to the access rights.

17. A server, comprising:
- a communications interface configured to communicate an identity code with a first communications device and a second communications device, wherein the identity code is unique during a predetermined period of time, wherein a representation of the identity code is communicated from the second communications device to the first communications device over a first communication interface to access multimedia objects being stored in the first communications device, the first communication interface being one of an audio interface or a picture-based interface, enabling said first communications device to associate the identity code or the representation thereof with a set of multimedia objects being stored in the first communications device, the set of multimedia objects being associated with access rights, and then from said first communications device to the server over a second communication interface, the server thereby resolving the identity of the second communications device and associating the first communications device with the second communications device;
- a receiver configured to receive access information relating to the access rights to access the set of multimedia objects from the first communications device, the set of multimedia objects being stored in the first communications device;
- a processing unit configured to generate credentials relating to the set of multimedia objects and the access rights associated therewith; and
- a transmitter configured to send the credentials and the resolved identity of the specific second communications device to the second communications device, thereby allowing the second communications device to access and display the set of multimedia objects being stored in the first communications device and to manipulate the set of multimedia objects according to the access rights.

* * * * *